United States Patent
Weng et al.

(10) Patent No.: US 11,334,642 B2
(45) Date of Patent: May 17, 2022

(54) SELF-LEARNING WEBPAGE LAYOUT BASED ON HISTORY DATA

(71) Applicant: SuccessFactors, Inc., South San Francisco, CA (US)

(72) Inventors: Sally Weng, Shanghai (CN); Xiao Zhi Yan, Shanghai (CN); Peter Zhao, Shanghai (CN)

(73) Assignee: SuccessFactors, Inc., South San Francisco, CA (US)

( * ) Notice: Subject to any disclaimer, the term of this patent is extended or adjusted under 35 U.S.C. 154(b) by 125 days.

(21) Appl. No.: 14/984,619

(22) Filed: Dec. 30, 2015

(65) Prior Publication Data

US 2017/0192983 A1   Jul. 6, 2017

(51) Int. Cl.
| | | |
|---|---|---|
| *G06F 16/958* | (2019.01) | |
| *H04L 29/08* | (2006.01) | |
| *G06F 40/106* | (2020.01) | |
| *H04L 67/02* | (2022.01) | |

(52) U.S. Cl.
CPC .......... *G06F 16/958* (2019.01); *G06F 40/106* (2020.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,965,998 B1 * | 2/2015 | Dicker | ............... | G06Q 30/0633 709/217 |
| 2004/0111678 A1 * | 6/2004 | Hara | ................ | G06F 17/30737 715/273 |
| 2009/0158166 A1 * | 6/2009 | Dewar | ................... | G06Q 30/02 715/745 |
| 2012/0042280 A1 * | 2/2012 | Hoffman | ........... | G06F 17/30867 715/800 |
| 2013/0031470 A1 * | 1/2013 | Daly, Jr. | ............ | G06F 17/30867 715/243 |
| 2015/0245084 A1 * | 8/2015 | Downing | ............ | H04N 21/2668 725/12 |
| 2015/0278369 A1 * | 10/2015 | Wong | ..................... | G06F 19/321 707/708 |
| 2016/0019464 A1 * | 1/2016 | Madhavan | ........ | G06F 17/30893 706/11 |
| 2016/0189514 A1 * | 6/2016 | Todasco | .................. | G08B 21/02 340/8.1 |

* cited by examiner

*Primary Examiner* — Mark D Featherstone
*Assistant Examiner* — Ranjit P Doraiswamy
(74) *Attorney, Agent, or Firm* — Schwegman Lundberg & Woessner, P.A.

(57) ABSTRACT

A system and method for implementing a self-learning webpage layout based on history data is disclose. A server system collects user preference data from one or more client system. The server system stores the collected user preference data in a database associated with the server system. The server system receives a webpage request from a client system, wherein the requested webpage includes a plurality of topical sections. For each respective topical section, the server system accesses user preference data associated with the respective topical section from the database associated with the server system. The server system automatically generates a customized layout for the requested webpage by arranging the one or more topical sections in association with the user preference data associated with each topical section.

18 Claims, 11 Drawing Sheets

SELF-LEARNING WEBPAGE LAYOUT BASED ON HISTORY DATA

TECHNICAL FIELD

The disclosed example embodiments relate generally to the field of automatic wehpage generation and, in particular, to the field of user customization.

BACKGROUND

The rise of the computer age has resulted in increased access to personalized services online. As the cost of electronics and networks drop, many services that were previously provided in person are now provided remotely over the Internet. For example, entertainment has increasingly shifted to the online space with companies streaming television (TV) shows and movies to members at home. Similarly, electronic mail (e-mail) has reduced the need for letters to be physically delivered. Instead, messages can be sent over networked systems almost instantly. Online social networking sites allow members to build and maintain personal and business relationships in a much more comprehensive and manageable manner.

As more and more services are provided online, users increasingly rely on online sources for news and information. Specifically, users often visit websites that include information about a variety of topics. With little or no barrier to entry, competition for user views is high. As such, websites have a large incentive to provide the most interesting data in the most convenient way, as fast as possible.

SUMMARY

In some implementations, methods and apparatus, including computer program products, are provided for automatically updating the layout of a topical webpage based on stored user interest data.

In one aspect, server system collects user preference data from one or more client systems. The server system stores the collected user preference data in a database associated with the server system. The server system receives a webpage request from a client system, wherein the requested webpage includes a plurality of topical sections. For each respective topical section, the server system accesses user preference data associated with the respective topical section from the database associated with the server system. The server system automatically generates a customized layout for the requested webpage by arranging the one or more topical sections in association with the user preference data associated with each topical section.

The above methods, apparatus, and computer program products may, in some implementations, further include one or more of the following features.

In some example embodiments, the user preference data is collected by analyzing user interactions received at the server system and wherein user interactions represent user interactions with a webpage displayed at the client system.

In some example embodiments, user interactions include clicks, likes, shares, views, duration of user viewing, eye tracking data, and hover data.

In some example embodiments, the server system stores user-specific preference data for each user of the server system and the server system determines the particular user associated with the webpage request. The server system accesses user preference data for the particular user before automatically generating a layout for the requested webpage.

For each topical section, the server system determines an interest score for the particular topical section based on the accessed user preference data.

The server system ranks each topical section based on the determined interest score.

In some example embodiments, the server system accesses a rank for each topical section. The server system then arranges the layout of the request webpage such that topical sections that have a higher rank are displayed more prominently than topical sections with a low rank.

In some example embodiments, the size of each topical section is determined based on the rank associated with each topical section. The server system receives an "add topical section" request for a new topical section. The server system generates an initial interest score for the new topical section.

The details of one or more variations of the subject matter described herein are set forth in the accompanying drawings and the description below. Other features and advantages of the subject matter described herein will be apparent from the description and drawings, and from the claims.

DESCRIPTION OF THE DRAWINGS

Some example embodiments are illustrated by way of example and not limitation in the Figures of the accompanying drawings, in which.

Like reference numerals refer to the same or similar parts throughout the drawings.

DETAILED DESCRIPTION

Figure 1:
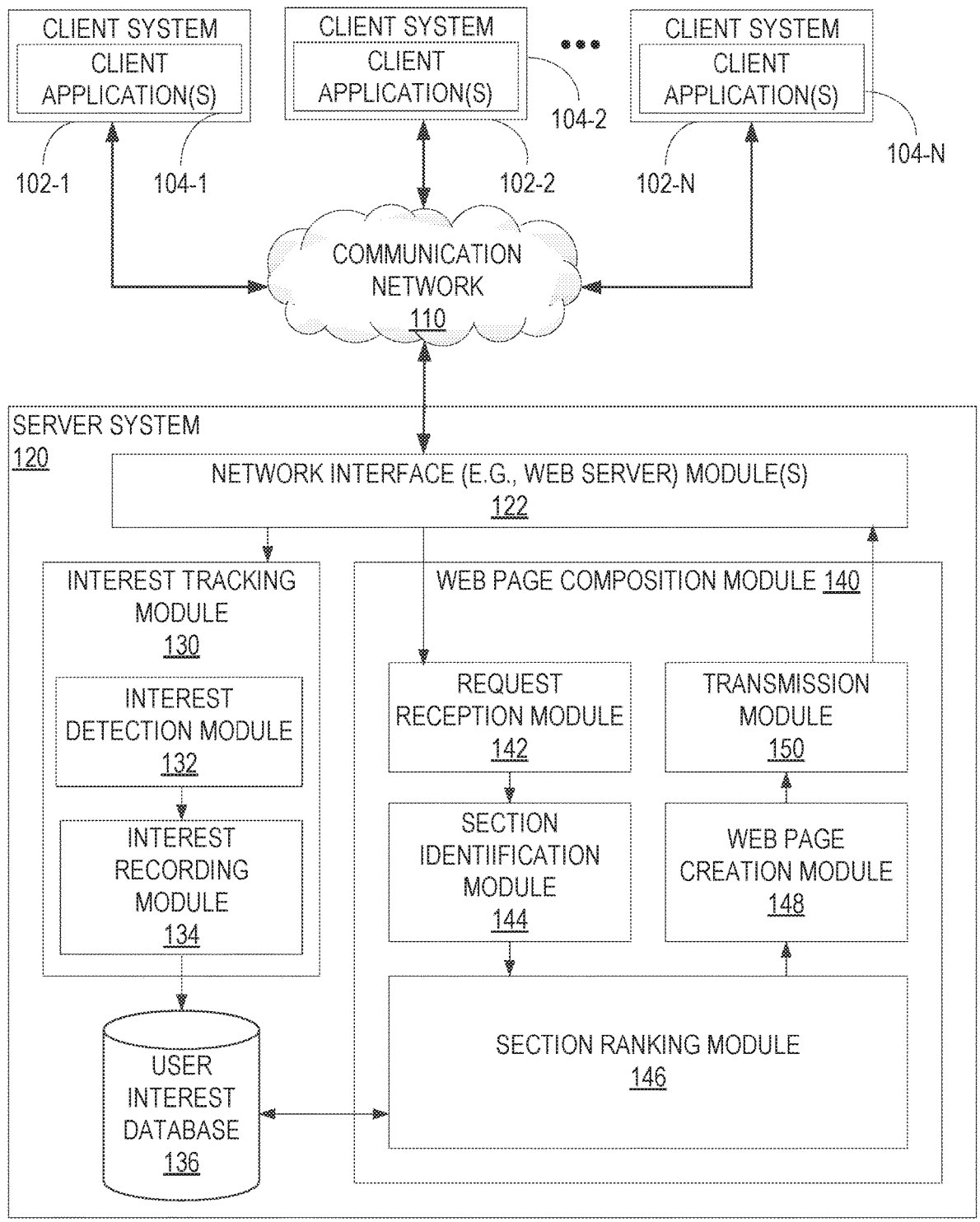
FIG. 1 is a network diagram depicting a client—server system, in some example embodiments, that includes various functional components of that system.

The present disclosure describes methods, systems, and computer-readable storage mediums storing computer program products for converting a serial data log into multiple concurrent queues for data restoration within a networked data storage system. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations and combinations of the various features and elements described herein.

In some example embodiments, a server system hosts a webpage that displays information about a variety of topics to a plurality of users. The website is designed such that information about each topic is grouped into a particular section of a page of the website. For example, the home page of the website displays several different sections including sports, politics, technology, entertainment and so on. The server system has an incentive to display each section based on the information that would be most interesting to a user who has accessed the website. However, manually measuring interest and rearranging the webpage would to be too time and money intensive to be a practical solution.

Instead, the server system records interest data from users to determine the aggregate level of interest of users in particular topics at a given time. In some example embodiments, the server system also records user-specific interest data. In some example embodiments, interest data is determined based on user actions at the website including clicking on links, hovering a mouse over a particular area, the amount of time spent reading articles or linked webpages, determining where a user is looking and for how long using eye-tracking technology. All user interest data is stored in a database associated with the server system.

In sonic example embodiments, when a webpage request is received from a user of a client system, the server system generates a user interest score for each section to be placed in the webpage. For each topic, the server system accesses the database that stores past user interest information. Using the stored user interest information, the server system generates an interest score for each topic. In some example embodiments, the interest score is normalized to be a portion of total interest relative to other topics. For example, if the total interest is represented as 1, then each topic will have a score that is a fraction of 1 and all the interest scores of the topics added together equal 1.

Based on the generated user interest score, the server system automatically arranges the sections on the page based on the level of interest in each section. This allows the page to be customized with up-to-the-minute interest data. In some example embodiments, the sections that have the highest interest score are displayed in the most prominent position. In some example embodiments, the most popular sections can occupy a larger portion of the webpage relative to the less popular sections.

FIG. 1 is a network diagram depicting a client—server system 100, in some example embodiments, which includes various functional components of that system. The client—server system 100 includes one or more client systems 102-1 to 102-N and a server system 120. One or more communication networks 110 interconnect these components. The communication network 110 may be any of a variety of network types, including local area networks (LAN), wide area networks (WAN), wireless networks, wired networks, the Internet, personal area networks (PAN) or a combination of such networks.

In some example embodiments, a client system (e.g., one of 102-1 to 102-N) is an electronic device, such as a personal computer, a laptop, a smartphone, a tablet, a mobile phone or any other electronic device capable of communication over the communication network 110. Some client systems 102 include one or more client applications 104-1 to 104-N, which are executed by the client systems 102-1 to 102-N, respectively. In some example embodiments, the client application(s) 104-1 to 104-N includes one or more applications from the set consisting of search applications, communication applications, productivity applications, storage applications, word processing applications, or any other useful applications. The client system 102-1 uses the client applications 104 to communicate with the server system 120 and transmit data to, and request data from, the server system 120.

In some example embodiments there are a plurality of client systems (102-1 to 102-N) that all connect and interact with the server system 120. Each of these transactions can occur simultaneously, depending on the bandwidth and processing power available to the server system 120 and the various client systems 102-1 to 102-N.

In some example embodiments, as shown by way of example in FIG. 1, the server system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with server system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a particular type of architecture, the various example embodiments are by no means limited to this architecture.

As shown by way of example in FIG. 1, the server system 120 includes a network interface module (e.g., a web server) 122, which receives requests (e.g., web requests) from various client systems 102-1 to 102-N, and communicates the requested webpages (or other data) back to the appropriate client systems 102-1 to 102-N when appropriate. For example, the network interface module(s) 122 receives a webpage request from a client system 102 and transmits the webpage request to the webpage composition module 140.

In other example embodiments, the server system 120 receives user interactions with a webpage associated with the server system 120 that was previously transmitted to the client system 102 (e.g., the user clicks on a link on a webpage). The network interface module(s) 122 transmits the user interactions to the interest tracking module 130. In some example embodiments, the interest tracking module 130 uses user interactions to determine user interest in one or more topics. The determined user interest is then stored in the user interest database 136.

As shown by way of example in FIG. 1, the data components include a user interest database 136 for storing data about user interest in one or more topics or sections of the website. The application logic components include, in the interest tracking module 130, an interest detection module 132 and an interest recording module 134. The webpage composition module 140 includes a request reception module 142, a section identification module 144, a section ranking module 146, a webpage creation module 148, and a transmission module 150.

In some example embodiments, the interest detection module 132 receives user interaction data from the one or more client systems 102. In some example embodiments, the user interaction data includes any data detailing user interaction with the webpages provided by the server system 120 including user clicks, likes, shares, user viewing time of articles, hover data (e.g., the data describing where and for how long a mouse or other indicator is hovering), eye tracking data (e.g., data showing where the user is looking on a screen and for how long), and so on.

In some example embodiments, the interest detection module 132 analyzes the received user interaction data to determine user interest information. For example, if a particular topic is being clicked on, viewed, liked, or shared more than others, the interest detection module 132 determines that the topic is of higher interest to users than other topics. The determined user interest information is then transferred to the interest recording module 134 for storage.

The interest recording module 134 receives user interest information from the interest detection module 132. The interest recording module 134 then stores the user interest information in the user interest database 136.

In some example embodiments, the user interest database 136 stores information about user interest in a variety of topics. In some example embodiments, the user interest information is stored as an interest score that represents its interest rank relative to other topics.

In some example embodiments, the request reception module 142 receives webpage requests from client systems 102. In some example embodiments, the webpage requests are for the base home page of the server system 120 (e.g., the front page or the first webpage you receive when entering the basic URL for the server system), which includes a plurality of topical sections. In other example embodiments, the webpage requests are for particular articles or webpages.

In some example embodiments, the section identification module 144 determines a list of potential topical sections to include in a given webpage. In some example embodiments, the list of sections is determined based on interest data for the entire user community. In other example embodiments, the section identification module 144 determines the user making the request and selects a topical section based on the user's specific interests.

In some example embodiments, the section ranking module 146 receives a list of topical sections from the section identification module 144. For each topical section in the list of sections, the section ranking module 146 accesses the user interest database 136 to determine user interest in the topical section. In some example embodiments, the sections are assigned scores relative to the amount of interest recorded in the user interest database 136. In some example embodiments, the scores are relative such that a total score amount is available and divided up among the topical sections based on popularity. In this way, if a particular section grows more popular, the other sections have their relative scores decreased by the amount that the particular section score is increased. In this way, the total interest score among all sections remains constant.

In sonic example embodiments, the webpage creation module 148 then automatically generates a final webpage. The final webpage includes one or more sections that are arranged based on their section ranking. Thus, the most popular and/or interesting sections are displayed more prominently than less popular or interesting sections.

The transmission module 150 then transmits the final webpage to the requesting client system 102. (via the network interface module(s) 122).

Figure 2:
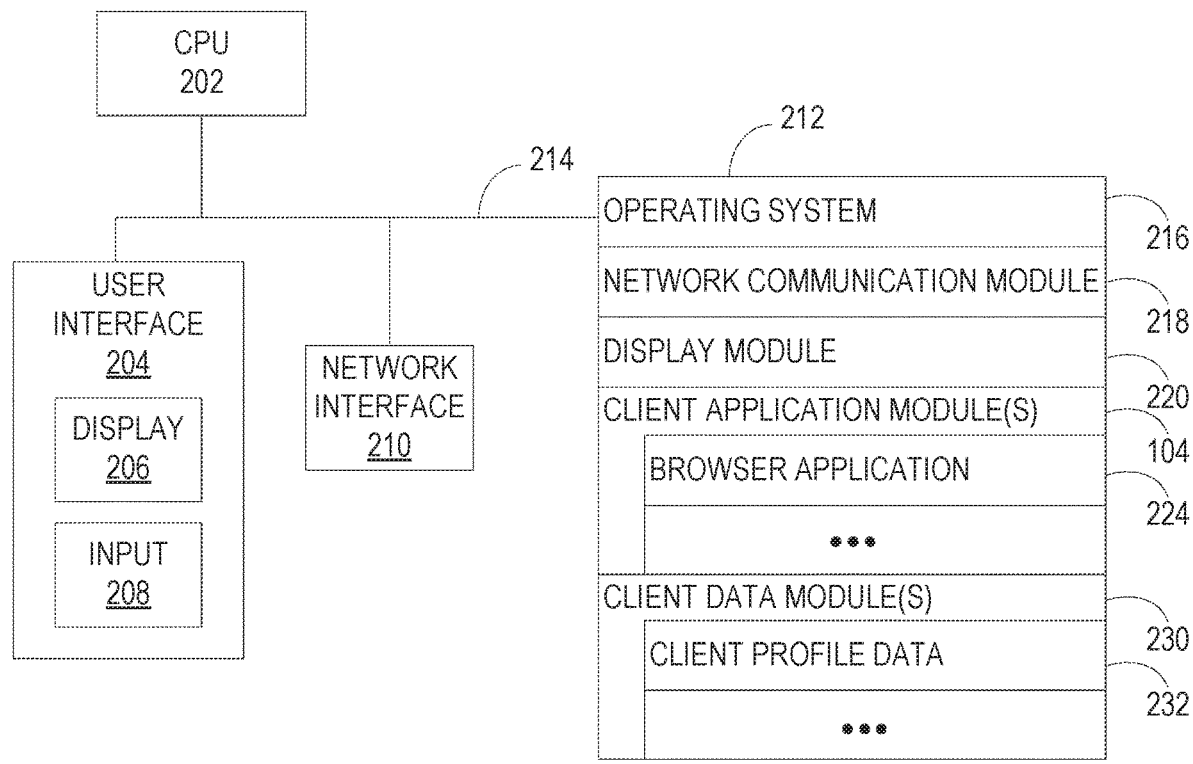
FIG. 2 is a block diagram further illustrating the client system, in accordance with some example embodiments.

FIG. 2 is a block diagram further illustrating the client system 102 (wherein client system 102 is a generic client system from the group of client systems labelled 102-1 to 102-N in FIG. 1), in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems 102 use a microphone and voice recognition to supplement or replace the keyboard.

Memory 212 includes high-speed random access memory, such as dynamic random-access memory (DRAM), static random access memory (SRAM), double data rate random access memory (DDR RAM), or other random access solid state memory devices, and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory comprise(s) a non-transitory computer-readable storage medium.

In some example embodiments, memory 212, or the computer-readable storage medium of memory 212, stores the following programs, modules, and data structures, or a subset thereof:

- an operating system 216 that includes procedures for handling various basic system services and for performing hardware-dependent tasks;
- a network communication module 218 that is used for connecting the client system 102 to other computers via the one or more communication network interfaces 210 (wired or wireless) and one or more communication networks 110, such as the Internet, other WANs, LANs, metropolitan area networks (MANs), etc.;
- a display module 220 for enabling the information generated by the operating system 216 and client application(s) 104-1 to 104-N to be presented visually on the display device 206;
- one or more client applications 104-1 to 104-N for handling various aspects of interacting with the server system (e.g., the server system 120 in FIG. 1), including but not limited to:
  - a browser application 224 for requesting webpages from the server system (e.g., the server system 120 in FIG. 1) and receiving responses from the server system (e.g., the server system 120 in FIG. 1); and
- client data module(s) 230 for storing data relevant to the clients, including but not limited to:
  - client profile data 232 for storing profile data related to a user of the server system (e.g., the server system 120 in FIG. 1) associated with the client system 102.

Figure 3:
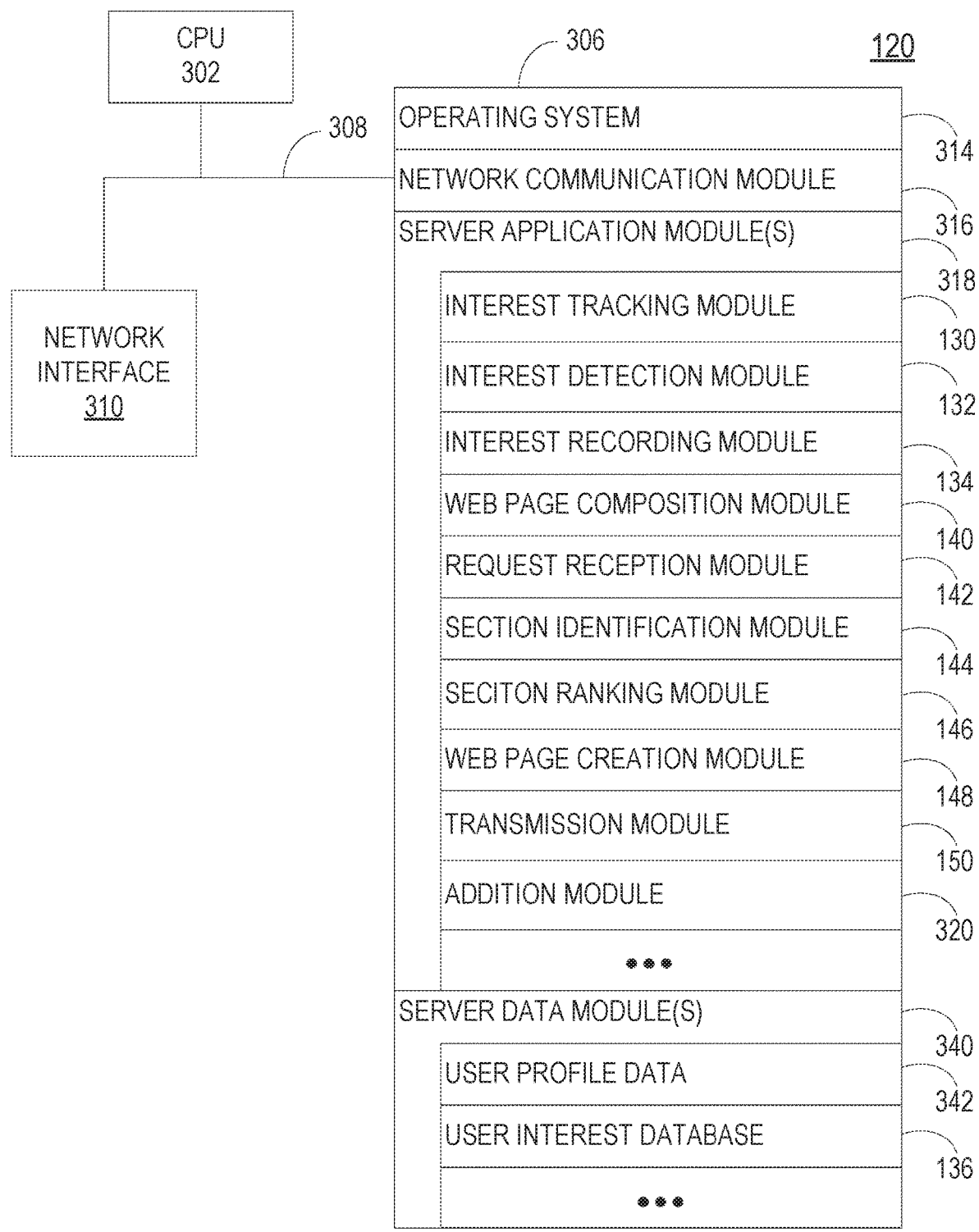
FIG. 3 is a block diagram further illustrating the server system, in accordance with some example embodiments.

FIG. 3 is a block diagram further illustrating the server system 120, in accordance with some example embodiments. Thus, FIG. 3 is an example embodiment of the server system 120 in FIG. 1. The server system 120 typically includes one or more CPUs 302, one or more network interfaces 310, memory 306, and one or more communication buses 308 for interconnecting these components. Memory 306 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory devices) within memory 306, comprises a non-transitory computer-readable storage medium. In some example embodiments, memory 306, or the computer-readable storage medium of memory 306, stores the following programs, modules, and data structures, or a subset thereof:

- an operating system 314 that includes procedures for handling various basic system services and for performing hardware-dependent tasks;
- a network communication module 316 that is used for connecting the server system 120 to other computers via the one or more network interfaces 310 (wired or wireless) and one or more communication networks 110, such as the Internet, other WANs, LANs, MANs, and so on;
- one or more server application modules 318 for performing the services offered by the server system 120, including but not limited to:
  - an interest tracking module 130 for receiving user interaction data and analyzing the user interaction data to determine user interest/preference for each topic in a plurality of topics;
  - an interest detection module 132 for analyzing one or more clicks, likes, shares, views, viewing time, hover data, and eye tracking data to determine user preferences for particular topics, such that topics with a large number of positive user interactions (such as likes, shares, long viewing times, and so on) are determined to have a higher user interest than topics with a smaller number of positive user interactions;
  - an interest recording module 134 for storing determined user interest data in a user interest database 136;
  - a webpage composition module 140 for receiving a user request for a particular webpage, and in response, automatically generating a website based on customized website layout;
  - a request reception module 142 for receiving a webpage request from a client system (e.g., the client system 102 in FIG. 1);
  - a section identification module 144 for determining, based on a received webpage request, a list of topical sections that are associated with the requested webpage based on the requesting user and the specifically requested webpage;
  - a section ranking module 146 for determining an interest score for each topical section based on user interest data stored in the user interest database 136 and then ranking the topical sections based on the determined interest score;
  - a webpage creation module 148 for creating a customized webpage layout including one or more topical sections that are arranged based on the ranking for each topical section;
  - a transmission module 150 for transmitting a generated webpage to the requesting client system (e.g., the client system 102 in FIG. 1); and
  - an addition module 320 for adding a new topical section to a list of current topical sections and determining an initial ranking for the new topical section; and
- server data module(s) 340, holding data related to the server system 120, including but not limited to:
  - user profile data 342 including both data provided by the user, who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to social networks, customers, past business relationships, and seller preferences; and inferred member information based on the member's activity, social graph data, overall trend data for the server system 120, and so on; and
  - a user interest database 136 for storing data describing the current level of user interest in each topical section based on previous user interactions.

Figure 4:
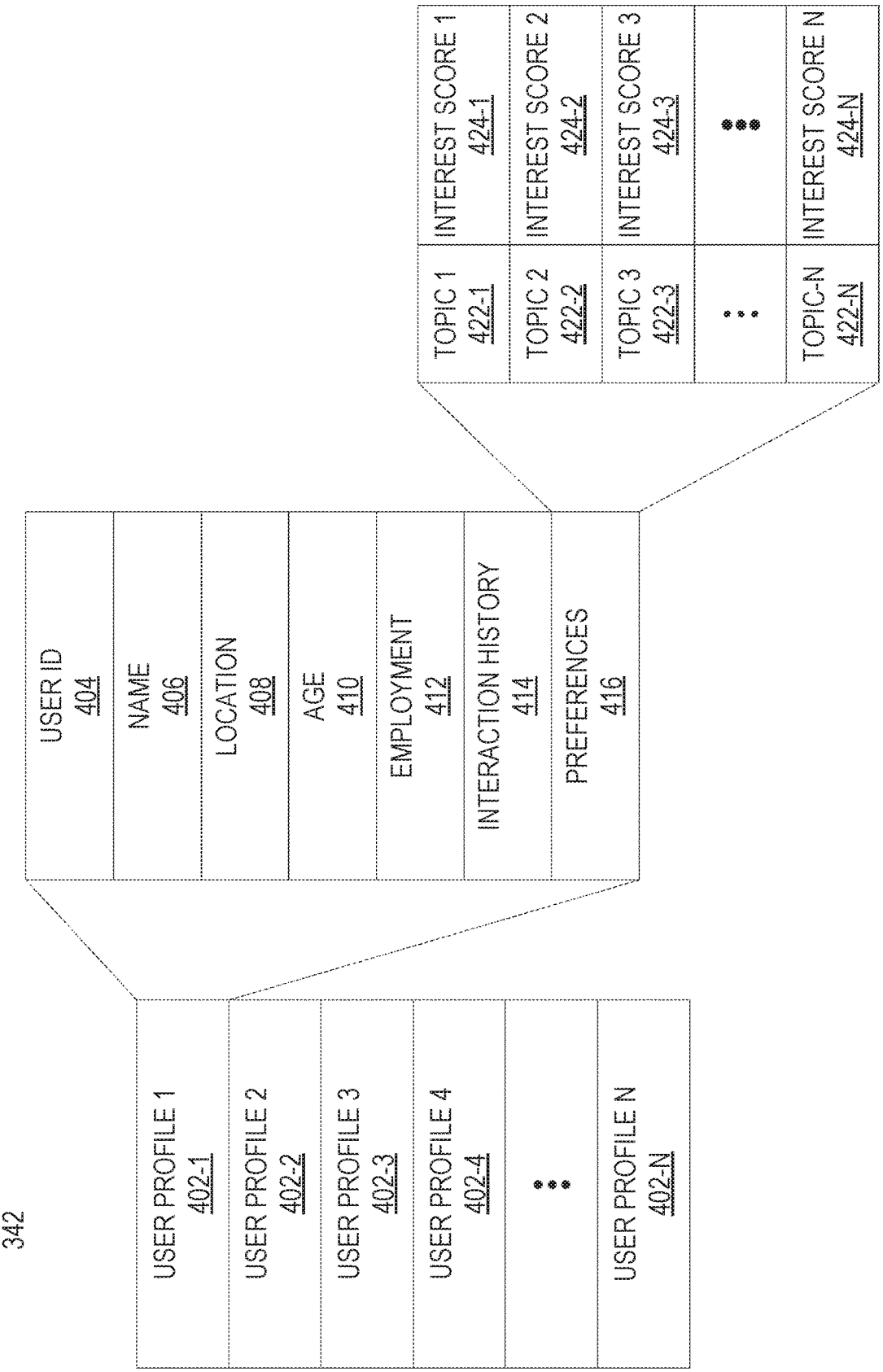
FIG. 4 depicts a block diagram of an exemplary data structure, in accordance with some example embodiments, for the user profile data for storing user profiles.

FIG. 4 depicts a block diagram of an exemplary data structure for the user profile data 342 for storing user profiles in accordance with some example embodiments. In accordance with some example embodiments, the user profile data 342 includes a plurality of user profiles 402-1 to 402-N, each of which corresponds to a user of the server system (e.g., the server system 120 in FIG. 1).

In sonic example embodiments, a respective user profile 402 stores a unique user ID 404 for the user profile 402, a name 406 for the user (e.g., the user's legal name or chosen nickname), user location 408, user age 410, user past employment 412, user interaction history 414 (e.g., interactions with a webpage associated with the server system (e.g., the server system 120 in FIG. 1)), and user preferences 416.

In some example embodiments, the user preferences 416 include a list of topics (422-1 to 422-N) and associated interest scores (424-1 to 424-N). Each topic 422 represents a particular topic of information that could be displayed on a webpage in a topical section. For example, topics could include sports, entertainment, politics, technology, and so on.

In addition, each topic 422 has an associated interest score 424. In some example embodiments, an interest score 424 represents an estimation (based on user interaction history 414) of the user's interest in the topic 422 with which it is associated. For example, each topic 422 will have an interest score 424 between 0 and 1, with 0 indicating lowest interest and 1 indicating highest score. In some example embodiments, the interest scores 424 are fractions of a total value (e.g., 100) such that the total of all interest scores 424, when summed, add up to the total value.

For example, if there are five topics, Topic A, Topic B, Topic C, Topic D, and Topic E, the total score would add up to a total value that remains constant. Thus, if Topic A has an interest score of 40, Topic B has an interest score of 15, Topic C has an interest score of 5, Topic D has an interest score of 25, and Topic E has an interest score of 15, the total interest score is (40+15+5+25+15) is 100. If one score is increased (e.g., based on received user interactions) one or more other scores will have a corresponding decrease.

Figure 5A:
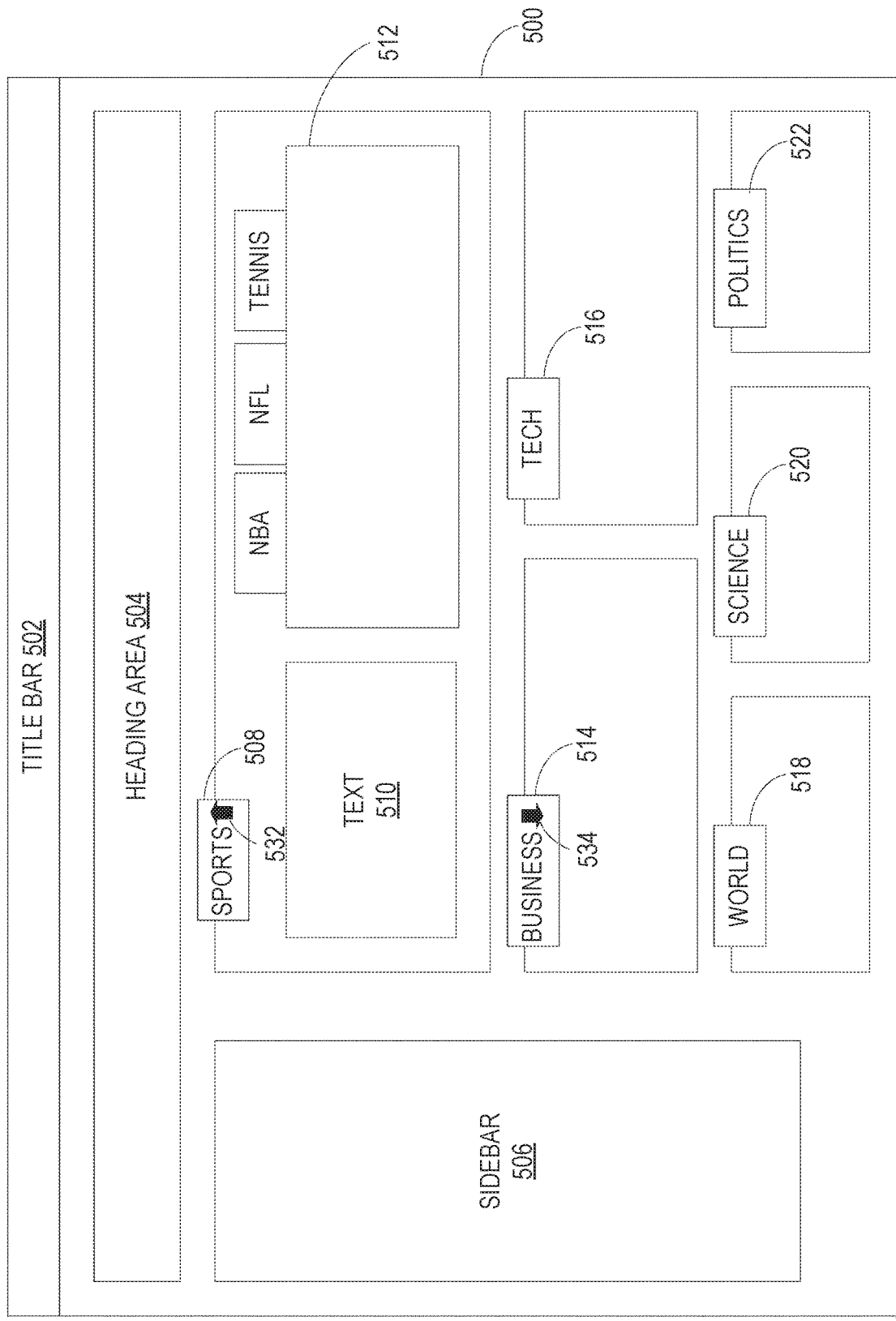
FIGS. 5A and 5B are user interface diagrams, in accordance with some example embodiments, illustrating an example of an automatically generated webpage.

FIG. 5A is a user interface diagram illustrating an example of an automatically generated webpage 500, in accordance with some example embodiments. In the example interface of FIG. 5A, the webpage 500 includes a title bar 502, giving the name and/or logo of the webpage 500 or the associated server system (e.g., the server system 120 in FIG. 1).

The webpage 500 further includes a heading area 504. In some example embodiments, the heading area 504 includes information that is important but does not necessarily belong within another section, such as breaking news or deadline information.

In some example embodiments, the webpage 500 also includes a sidebar 506. In some example embodiments, the sidebar 506 is used for navigation in the webpage 500. For example, the sidebar 506 includes a list of links that redirect to one or more other sections of the webpage 500.

In some example embodiments, the webpage 500 also includes a plurality of topical sections (508 and 514 to 522). Each topical section is associated with a particular topic (e.g., sports section 508, business section 514, tech section 516, and so on). In some example embodiments, some topical sections also include movement indication arrows. Movement indication arrows (e.g., 532 and 534) reflect whether the topical section has recently risen (with an upward facing arrow) or fallen (with a downward facing arrow) in popularity or user interest.

In this example, the sports section 508 has an upward facing arrow 532 indicating that the sports section 508 has recently risen in popularity, and the business section 514 has a downward facing arrow 534, indicating that the business section 514 had recently fallen in popularity.

The remaining topical sections have no movement arrows, indicating that those sections have not recently changed in popularity.

In this example, the sports section 508 is the most popular and as such it is positioned in the most prominent position on the webpage 500. In addition, the sports section 508 is larger than other topical sections and includes both a text section 510 and a tabbed display area 512 allowing a user to select more in-depth information about the content within.

Figure 5B:
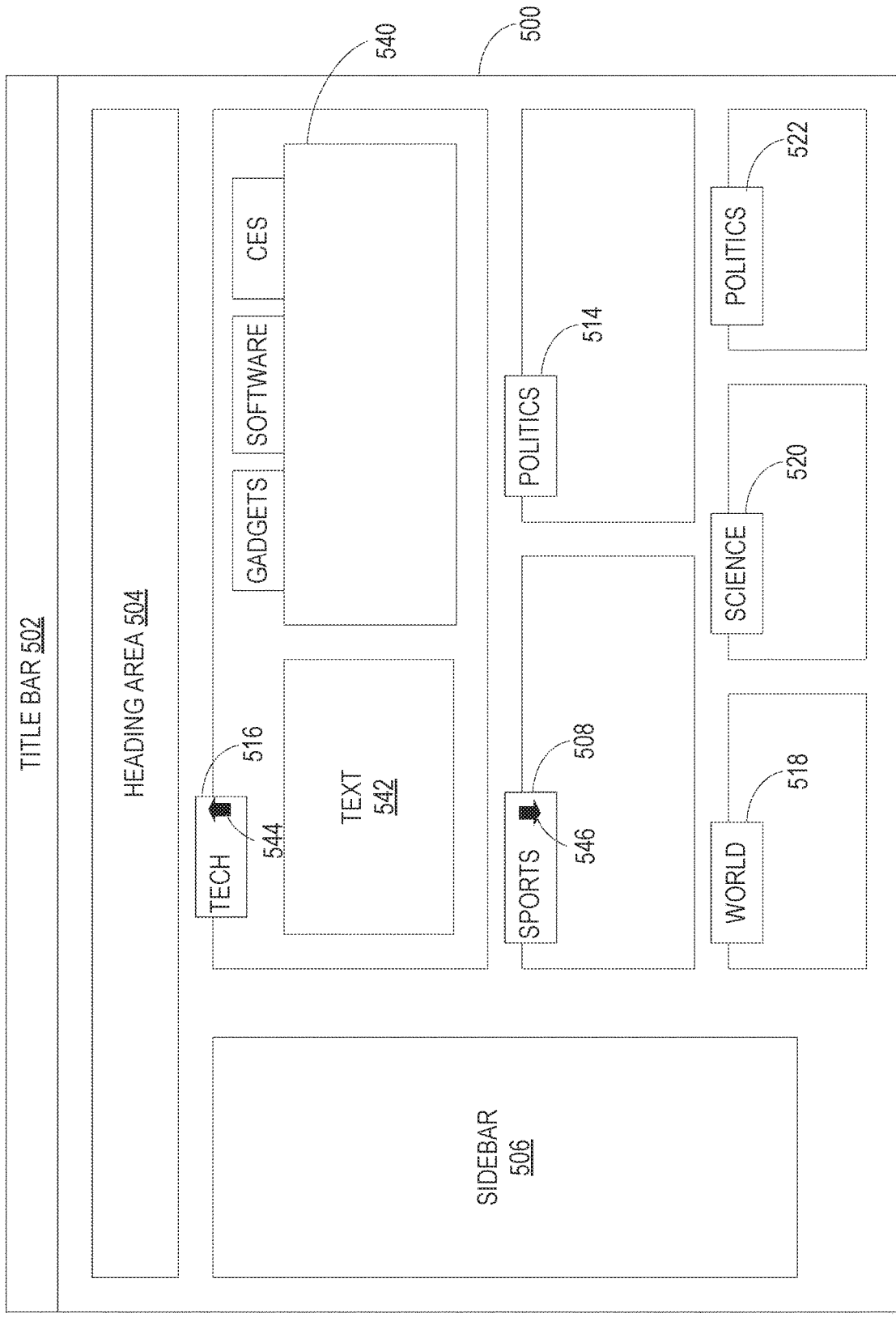

FIG. 5B is a user interface diagram illustrating an example of an automatically generated webpage 500, in accordance with some example embodiments. In the example interface of FIG. 5B, which follows from FIG. 5A, the webpage 500 includes a title bar 502, a heading area 504, a sidebar 506, and a plurality of topical sections (508, 514, 516, 518, 520, and 522).

FIG. 5B shows an example where the position and importance of the topical sections has been changed. Because the position of the topical sections is based on the determined popularity of each topical section, the change of position results from an updated estimation of the relative importance of each topical section.

In this specific example, the tech section 516 has been determined to have an increased importance and thus has moved to the more prominent position. At the same time, an upward arrow 544 is displayed near the section title. With the more prominent position, the tech section 516 includes a text section 542 and a tabbed content section 540.

Similarly, the sports section 508 is displayed at a position of lower importance, with less space and a downward facing arrow 546. In this example, the Super Bowl (which was the reason that sports was highly rated in FIG. 5A) has ended and a tech conference (e.g., CES) has begun, raising the profile of the tech section 516.

Figure 6:
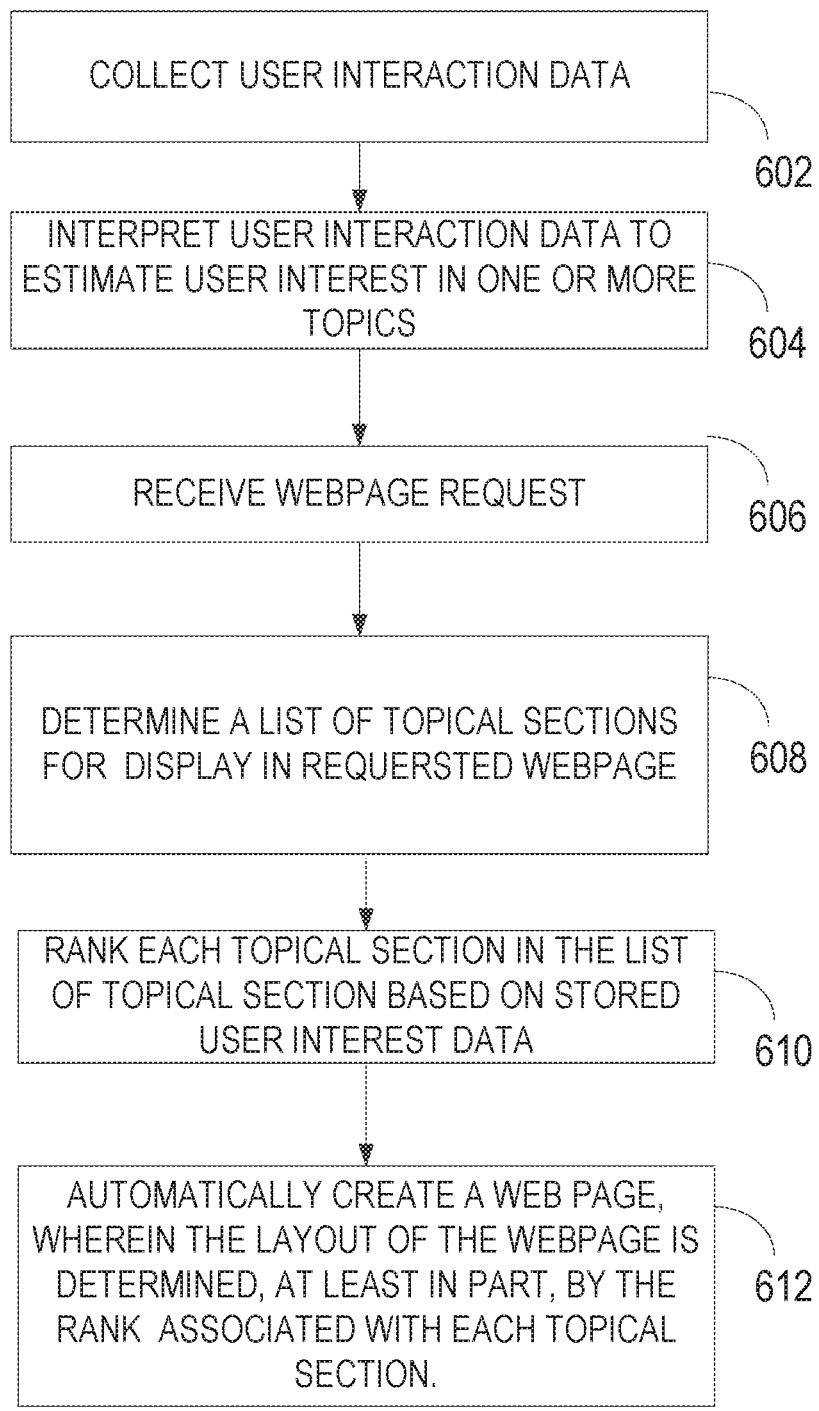
FIG. 6 is a flow diagram illustrating a method, in accordance with some example embodiments, for automatically updating the layout of a webpage based on received user interest data.

FIG. 6 is a flow diagram illustrating a method for automatically updating the layout of a webpage based on received user interest data, in accordance with some example embodiments. Each of the operations shown in FIG. 6 may correspond to instructions stored in a computer memory or computer-readable storage medium. In some example embodiments, the method described in FIG. 6 is performed by the server system (e.g., the server system 120 in FIG. 1) shown in FIG. 1. However, other systems and configurations can be used to implement the method described in FIG. 6.

In some embodiments the method is performed at a server system (e.g., the server system 120 in FIG. 1) including one or more processors and memory storing one or more programs for execution by the one or more processors.

The server system (e.g., the server system 120 in FIG. 1) collects (602) user interaction data. In some example embodiments, the user interaction data is collected based on user interactions with the webpages provided by the server system (e.g., the server system 120 in FIG. 1). In other example embodiments, the server system (e.g., the server system 120 in FIG. 1) can collect user interest information from third party webpages.

User interaction data includes clicks, likes, hover data, eye tracking data, and so on. The server system (e.g., the server system 120 in FIG. 1) then interprets (604) the received user interaction data to estimate user interest in particular topics. For example, each time a user clicks on a link, the server system (e.g., the server system 120 in FIG. 1) determines a topic associated with the link and records the click as showing increased interest in the topic associated with a link.

In some example embodiments, the server system (e.g., the server system 120 in FIG. 1) records thousands (or millions) of such interactions and is able to determine which topics are currently the most interesting to users in general. The server system (e.g., the server system 120 in FIG. 1) generates an interest score or ranking for each topic and stores it in a database associated with the server system (e.g., the server system 120 in FIG. 1).

The server system (e.g., the server system 120 in FIG. 1) receives (606) a webpage request from a client system (e.g., the client system 102 in FIG. 1). In some example embodiments, the webpage request indicates the requesting user and the specific page requested.

In some example embodiments, the server system (e.g., the server system 120 in FIG. 1) determines (608) a list of topical sections for display in the requested webpage. In some example embodiments, the list of topical sections is based at least in part on the requesting member and the specific webpage requested. For example, the list of topical sections is determined based on known interests of the requesting user.

For each respective topical section in the list of sections, the server system (e.g., the server system 120 in FIG. 1) generates (610) a rank for the respective topical section based on stored user interest data. In this way, a topical section that is determined to be more interesting or important will be ranked higher than a topical section that is determined to be of little current interest to users generally or to the requesting user specifically.

The server system (e.g., the server system 120 in FIG. 1) then automatically creates (612) a webpage in response to the webpage request, wherein the layout of the webpage is determined, at least in part, by the rank of each topical section.

Figure 7A:
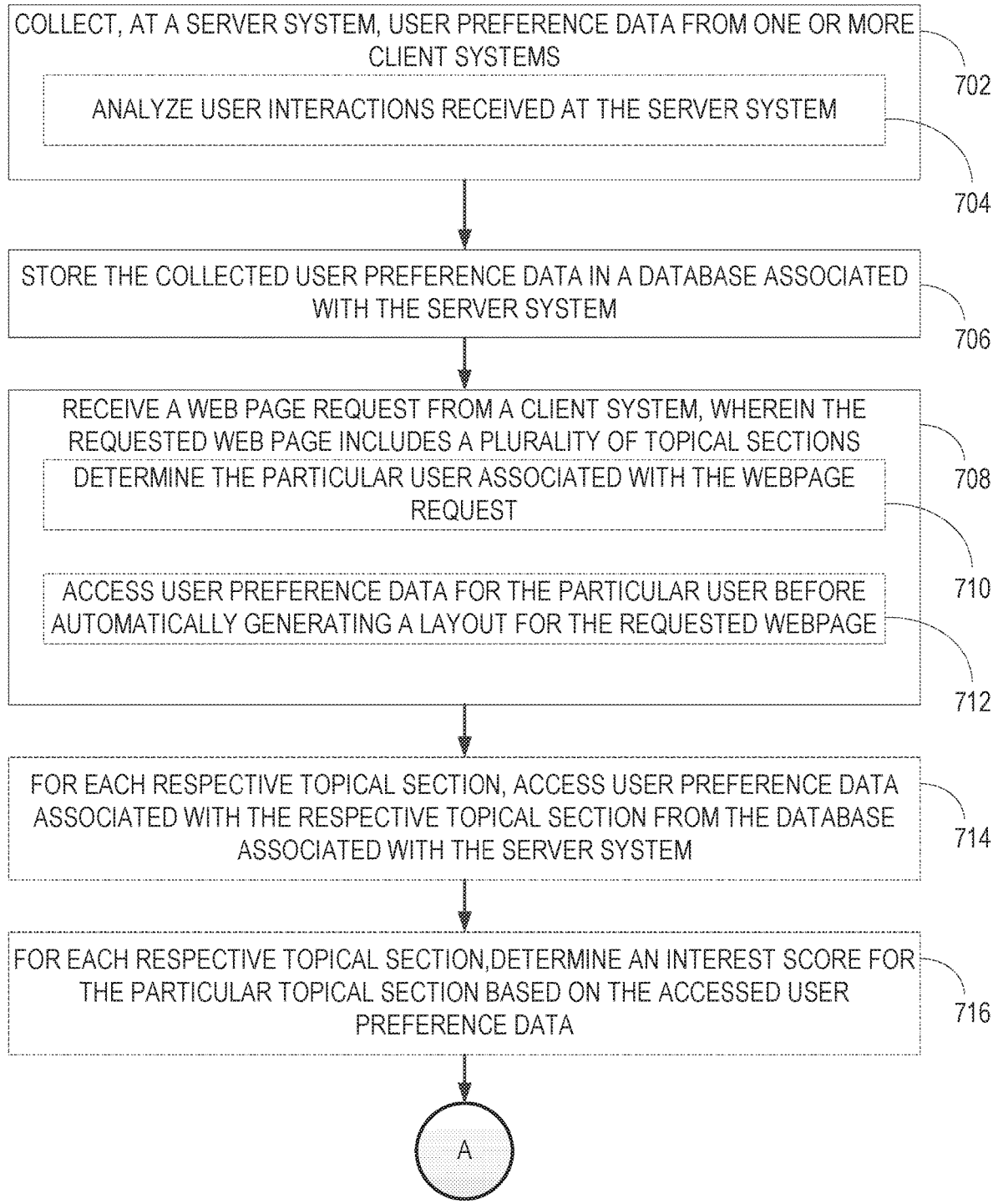
FIGS. 7A and 7B are flow diagrams illustrating a method, in accordance with some example embodiments, for automatically updating the layout of a webpage based on received user interest data.

FIG. 7A is a flow diagram illustrating a method, in accordance with some example embodiments, for automatically updating the layout of a webpage based on received user interest data. Each of the operations shown in FIG. 7A may correspond to instructions stored in a computer memory or computer-readable storage medium. Optional operations are indicated by dashed lines (e.g., boxes with dashed-line borders). In some embodiments, the method described in FIG. 7A is performed by the server system (e.g., the server system 120 in FIG. 1). However, the method described can also be performed by any other suitable configuration of electronic hardware.

In some embodiments the method is performed at a server system (e.g., the server system 120 in FIG. 1) including one or more processors and memory storing one or more programs for execution by the one or more processors.

In some example embodiments, the server system (e.g., the server system 120 in FIG. 1) collects (702) user preference data from one or more client systems (e.g., client systems 102-1 to 102-N). In some example embodiments, user preference data is obtained from users as they interact with the webpages provided by the server system (e.g., the server system 120 in FIG. 1).

For example, as users interact with the interactive parts of a webpage (such as links or like buttons), the server system (e.g., the server system 120 in FIG. 1) receives those user interactions and analyzes (704) them to determine user interest based on how they interact with displayed content. In some example embodiments, user interactions include clicks, likes, shares, views, duration of user viewing, eye tracking data, and hover data.

The server system (e.g., the server system 120 in FIG. 1) stores (706) the collected user preference data in a database associated with the server system. Once the user preference data is stored in a database, the data is updated as additional user interaction data is received.

For example, the server system (e.g., the server system 120 in FIG. 1) generates relative scores for each topical section. The sum of the scores of all topical sections equals 1. Every topical section gets a score from 0-1, split from the sum score of 1. The higher a score associated with a topical section, the more popular that particular topical section is.

In some example embodiments, the server system (e.g., the server system 120 in FIG. 1) can use a variety of methods to generate and track relative scores. One such example method is detailed below.

When a new click (or other user interaction) is detected on topical section A, every other topical section in the list will give some percentage of their ranking to topical section A.

$$CS(A)=CS(A)+CS(B)*P+CS(C)*P+CS(D)*P+\ldots$$

$$CS(B)=CS(B)-CS(B)*P$$

$$CS(C)=CS(C)-CS(C)*P$$

...

Thus, the current score (CS) for A is updated to include the past score plus a percentage (P) of each other section's former current ranking. Similarly each other section has its ranking updated by subtracting the same percentage (P).

In another example, the percentage is P and the user clicks on section E. Below is the original ranking scores.

| Section | Ranking |
|---|---|
| A | 0.3 |
| B | 0.25 |
| C | 0.2 |
| D | 0.125 |
| E | 0.125 |

After the user clicks on E, the rankings are all adjusted by giving section E 10% of the ranking score for each other section.

Thus, after the click on section E, the rankings are:

| Section | Ranking |
|---|---|
| A | 0.3 − 0.03 = 0.27 |
| B | 0.25 − 0.025 = 0.225 |
| C | 0.2 − 0.02 = 0.18 |
| D | 0.125 − 0.0125 = 0.1125 |
| E | 0.125 + 0.03 + 0.025 + 0.02 + 0.0125 = 0.2125 |

After the ranking readjustment, the ranking order is updated to:

| Section | Score |
|---|---|
| A | 0.27 |
| B | 0.225 |
| E | 0.2125 |
| C | 0.18 |
| D | 0.1125 |

In some example embodiments, the system (e.g., the server system 120 in FIG. 1) only updates the scores at a particular interval, rather than updating the scores each time a user clicks a section. For example, the scores can be updated hourly or daily.

Once the scores are updated, the system (e.g., the server system 120 in FIG. 1) dynamically arranges the sections such that the most popular sections are displayed most prominently (e.g., at the top or larger in size, or both).

In some example embodiments, section scores can represent a system-wide popularity or interest score. In other example embodiments, section scores can be determined for particular users. Thus a particular user's history and interests can influence which topical sections are most prominently displayed to that user, but not other users.

In some example embodiments, the server system (e.g., the server system 120 in FIG. 1) also stores data about current events (e.g., sporting events, news events, political events, and so on) in a database at the server system (e.g., the server system 120 in FIG. 1). In some example embodiments, the server system (e.g., the server system 120 in FIG. 1) then adjusts the user interest data based on an estimation of user interest during a given time period. For example, during the world cup, the server system (e.g., the server system 120 in FIG. 1) may determine that user interest in sports would be abnormally high.

In some example embodiments, the server system (e.g., the server system 120 in FIG. 1) receives (708) a webpage request from a client system, wherein the requested webpage includes a plurality of topical sections. In some example embodiments, the server system stores user-specific preference data for each user of the server system (e.g., the server system 120 in FIG. 1).

In some example embodiments, the server system (e.g., the server system 120 in FIG. 1) determines (710) a particular user associated with the webpage request. The server system (e.g., the server system 120 in FIG. 1) then accesses (712) user preference data specifically associated with the particular user before automatically generating a layout for the requested webpage.

For each respective topical section, the server system (e.g., the server system 120 in FIG. 1) accesses (714) user preference data associated with the respective topical section from the database associated with the server system (e.g., the server system 120 in FIG. 1).

For each topical section, the server system (e.g., the server system 120 in FIG. 1) determines (716) an interest score for the particular topical section based on the accessed user preference data.

Figure 7B:
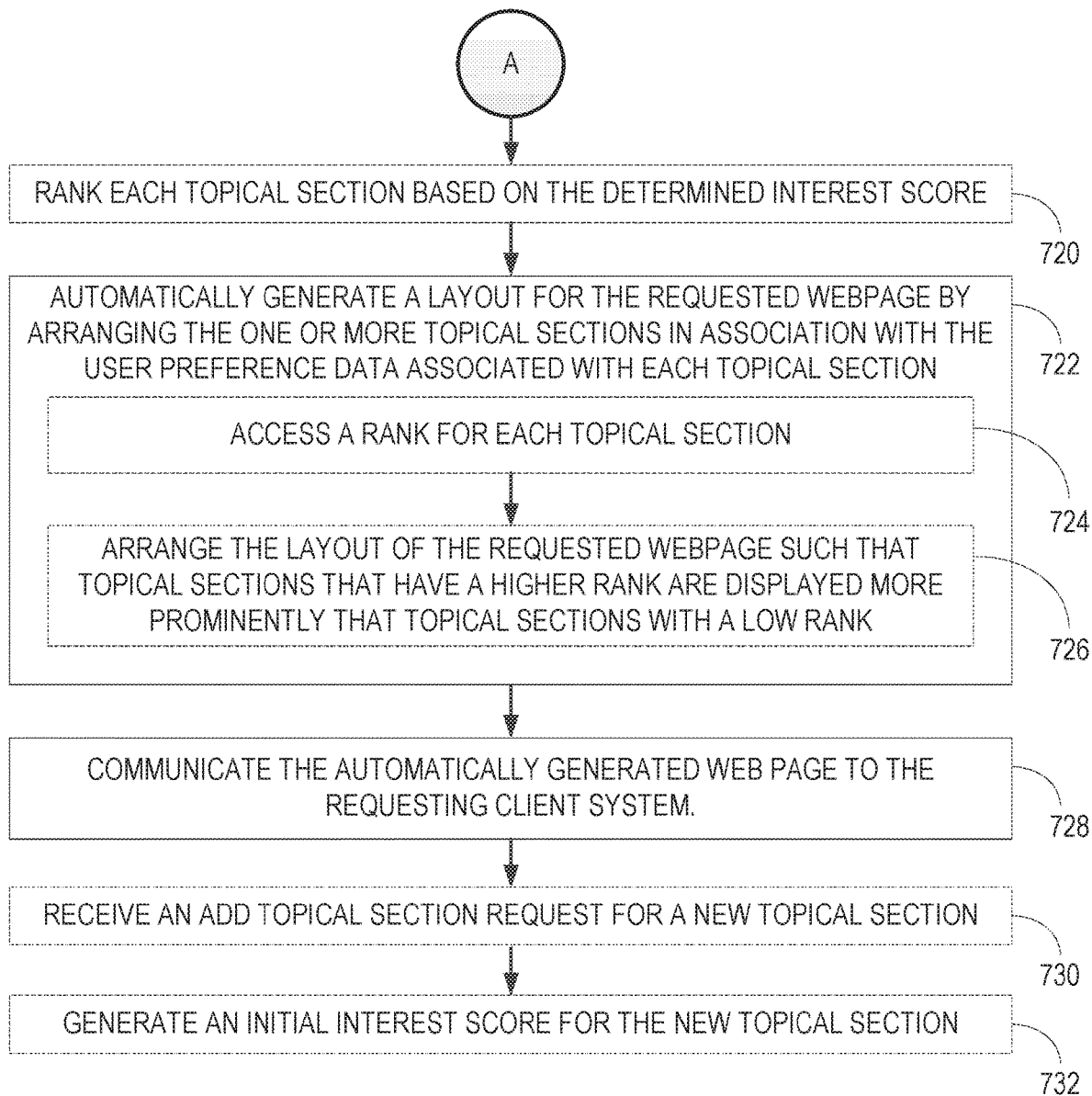

FIG. 7B is a flow diagram illustrating a method, in accordance with some example embodiments, for automatically updating the layout of a webpage based on received user interest data. Each of the operations shown in FIG. 7B may correspond to instructions stored in a computer memory or computer-readable storage medium. Optional operations are indicated by dashed lines (e.g., boxes with dashed-line borders). In some embodiments, the method described in FIG. 7B is performed by the server system (e.g., the server system 120 in FIG. 1). However, the method described can also be performed by any other suitable configuration of electronic hardware.

In some embodiments the method is performed at a server system (e.g., the server system 120 in FIG. 1) including one or more processors and memory storing one or more programs for execution by the one or more processors.

In some example embodiments, the server system (e.g., the server system 120 in FIG. 1) ranks (720) each topical section based on the determined interest score. As noted above, topical sections with high scores are ranked higher than topical sections with low interest scores.

In some example embodiments, the server system (e.g., the server system 120 in FIG. 1) automatically generates (722) a layout for the requested webpage by arranging the one or more topical sections in association with the user preference data associated with each topical section.

In this way, the server system (e.g., the server system 120 in FIG. 1) accesses (724) a rank for each topical section. The server system (e.g., the server system 120 in FIG. 1) then arranges (726) the layout of the requested webpage such that topical sections that have a higher rank are displayed more prominently that topical sections with a low rank.

In some example embodiments, the size of each topical section is determined based on the rank associated with each topical section. Thus, the highest ranked topical section is significantly larger than much lower ranked topical sections. In addition, the largest topical section may include additional information (e.g., a tabbed display area as seen in FIG. 5) that is not displayed for less highly ranked topical sections.

The server system the server system 120 in FIG. 1) then communicates (728) the automatically generated webpage to the requesting client system (e.g., the client system 102 in FIG. 1).

In some example embodiments, the server system (e.g., the server system 120 in FIG. 1) receives (730) an add topical section request for a new topical section. In some example embodiments, the server system (e.g., the server system 120 in FIG. 1) generates an initial interest score for the new topical section.

In some example embodiments, a new section or topic is added. To accommodate the new section or topic the server system (e.g., the server system 120 in FIG. 1) either has three options.

In some example embodiments, the server system (e.g., the server system 120 in FIG. 1) sets the ranking for the new section to a high value, such that the new section is displayed near or at the top of the webpage. The simplest algorithm for this mode is: reduce every original section's ranking to half, and then make the new section ranking=0.5.

In some example embodiments, the new section can be added to the bottom of the page. The simplest algorithm for this mode is: make the newly added section's ranking=0.

In some example embodiments, the new section will be somewhere in the middle of the webpage or topical section rankings. The simplest algorithm for this mode is: firstly, make the newly added section's ranking=0; then click it (according to the click algorithm) once to increase its ranking by one positive interaction as an initial starting boost.

When removing a section from the page, the server system (e.g., the server system 120 in FIG. 1) clears its rank. The rank can then be given to other sections by equally distributing it, or based on the weight of each section's original rankings.

SOFTWARE ARCHITECTURE

Figure 8:
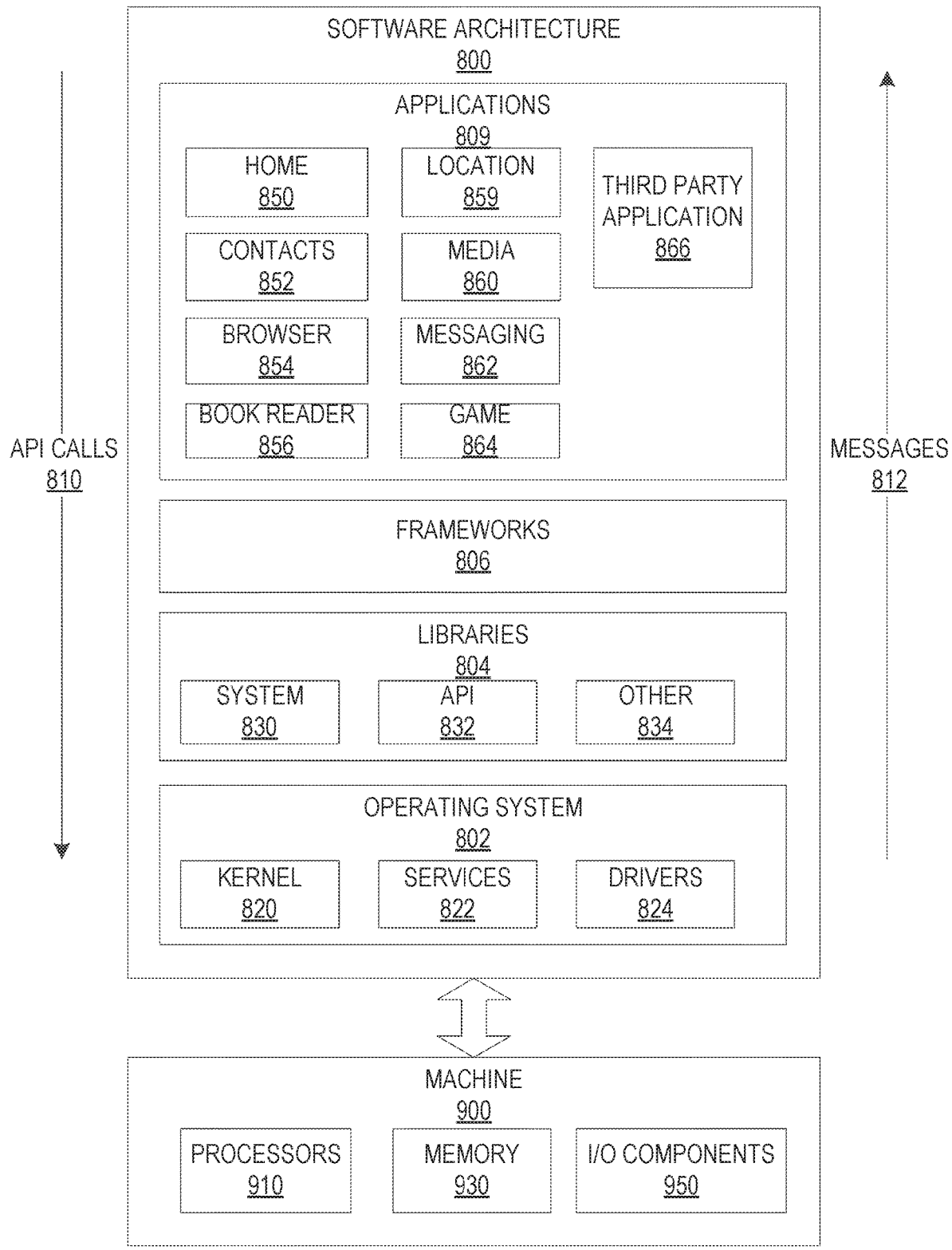
FIG. 8 is a block diagram illustrating an architecture of software, which may be installed on any of one or more devices, in accordance with some example embodiments.

FIG. 8 is a block diagram illustrating an architecture of software 800, which may be installed on any one or more of the devices of FIG. 1. FIG. 8 is merely a non-limiting example of an architecture of software 800, and it will be appreciated that many other architectures may be implemented to facilitate the functionality described herein. The software 800 may be executing on hardware such as a machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 809. Operationally, the applications 809 may invoke API calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 809. The libraries 804 may include system libraries 830 (e.g., C standard library) that may provide functions such as memory allocation functions, string manipulation functions, mathematic functions, and the like. In addition, the libraries 804 may include API libraries 832 such as media libraries (e.g., libraries to support presentation and manipulation of various media formats such as MPEG4, H.264, MP3, AAC,AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 809.

The frameworks 806 may provide a high-level common infrastructure that may be utilized by the applications 809, For example, the frameworks 806 may provide various graphical user interface (GUI) functions, high-level resource management, high-level location services, and so forth. The frameworks 806 may provide a broad spectrum of other APIs that may be utilized by the applications 809, some of which may be specific to a particular operating system 802 or platform.

The applications 809 include a home application 850, a contacts application 852, a browser application 854, a book reader application 856, a location application 859, a media application 860, a messaging application 862, a game application 864, and a broad assortment of other applications such as a third party application 866. In a specific example, the third party application 866 (e.g., an application developed using the Android™ or iOS™ software development kit (SDK) by an entity other than the vendor of the particular platform) may be mobile software running on a mobile operating system 802 such as iOS™, Android™, Windows® Phone, or other mobile operating systems 802. In this example, the third party application 866 may invoke the API calls 810 provided by the mobile operating system 802 to facilitate functionality described herein.

EXAMPLE MACHINE ARCHITECTURE AND MACHINE-READABLE MEDIUM

Figure 9:
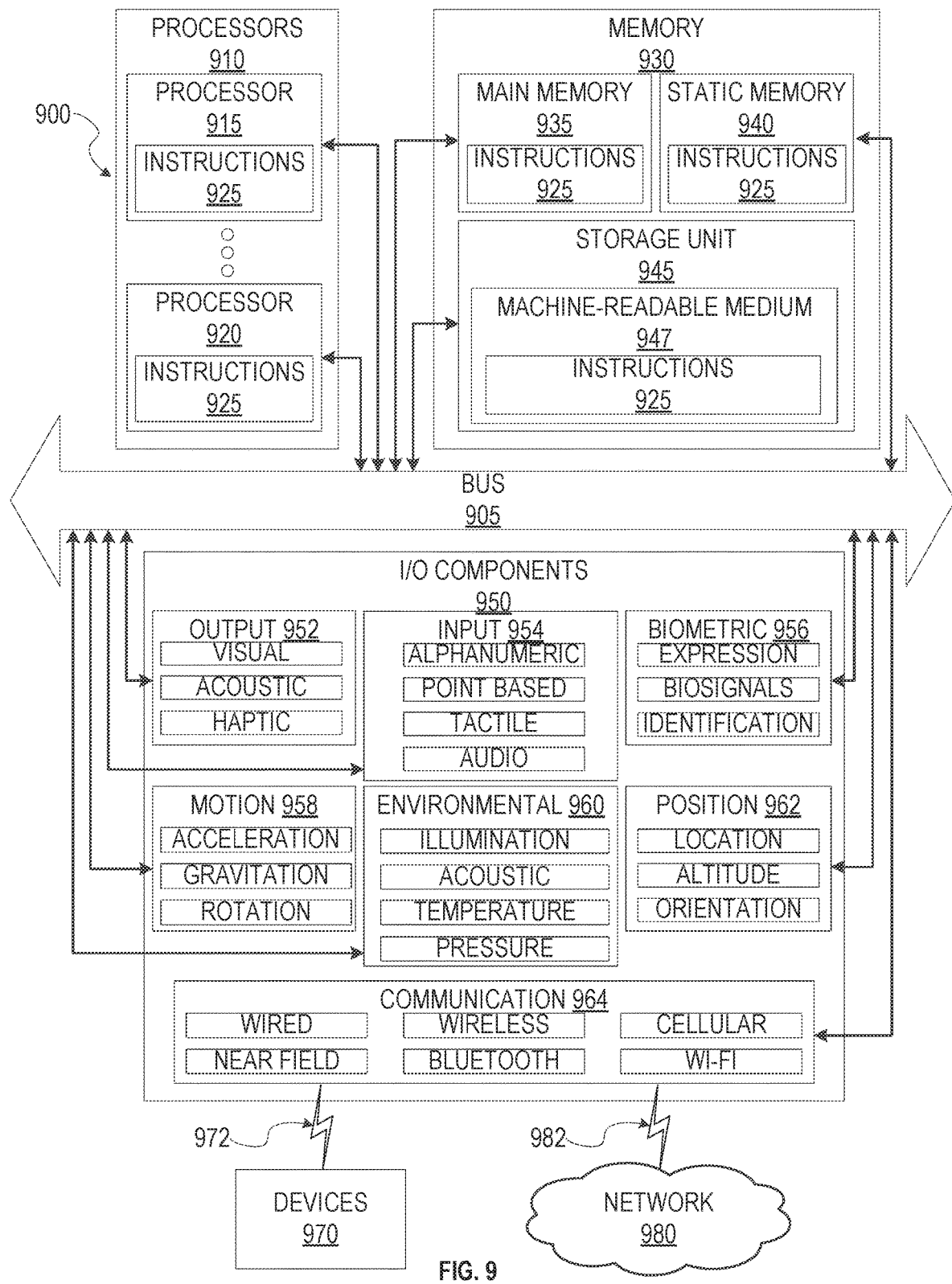
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software 800, a program, an application, an apples, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and. I/O components 950, which may be configured to communicate with each other via a bus 905. In an example embodiment, the processors 910 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 915 and a processor 920, which may execute the instructions 925. The term "processor" is intended to include multi-core processors 910 that may comprise two or more independent processors 915, 920 (also referred to as "cores") that may execute the instructions 925 contemporaneously. Although FIG. 9 shows multiple processors 910, the machine 900 may include a single processor 910 with a single core, a single processor 910 with multiple cores (e.g., a multi-core processor), multiple processors 910 with a single core, multiple processors 910 with multiple cores, or any combination thereof.

The memory 930 may include a main memory 935, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 935, within the static memory 940, within at least one of the processors 910 (e.g., within the processor's cache memory), or any suitable combination thereof, during execution thereof by the machine 900. Accordingly, the main memory 935, the static memory 940, and the processors 910 may be considered machine-readable media 947.

As used herein, the term "memory" refers to a machine-readable medium 947 able to store data temporarily or permanently and may be taken to include, but not be limited to, random-access memory (RAM), read-only memory (ROM), buffer memory, flash memory, and cache memory. While the machine-readable medium 947 is shown, in an example embodiment, to be a single medium, the term "machine-readable medium" should be taken to include a single medium or multiple media (e.g., a centralized or distributed database, or associated caches and servers) able to store the instructions 925. The term "machine-readable medium" shall also be taken to include any medium, or combination of multiple media, that is capable of storing instructions (e.g., instructions 925) for execution by a machine (e.g., machine 900), such that the instructions 925, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display such as a plasma display panel (PUP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), acoustic sensor components (e.g., one or more microphones that detect background noise), temperature sensor components e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 and/or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine 900 and/or any of a wide variety of peripheral devices (e.g., a peripheral device coupled via a USB).

Moreover, the communication components 964 may detect identifiers and/or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 964 such as location via Internet Protocol (IP) geo-location, location via WI-Fi® signal triangulation, location via detecting an NFC beacon signal that may indicate a particular location, and so forth.

TRANSMISSION MEDIUM

In various example embodiments, one or more portions of the network 980 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., HTTP). Similarly, the instructions 925 may be transmitted and/or received using a transmission medium via the coupling 972 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software.

Furthermore, the machine-readable medium 947 is non-transitory other words, not having any transitory signals) in that it does not embody a propagating signal. However, labeling the machine-readable medium 947 as "non-transitory" should not be construed to mean that the medium is incapable of movement; the medium should be considered as being transportable from one physical location to another. Additionally, since the machine-readable medium 947 is tangible, the medium may be considered to be a machine-readable device.

TERM USAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A method comprising:
  performing operations for dynamically rearranging topical sections associated with a webpage displayed in a graphical user interface, the operations including:
  for each topical section, accessing user preference data associated with the topical section from a database associated with the server system and generating a section interest score for the topical section based on the user preference data, the user preference data including a user interest score for each of the topics included in the topical section, the user interest score based on interactions of a plurality of users with each of the topics, the section interest score representing a system-wide popularity of the topical section;
  automatically generating a customized layout for the requested webpage by arranging the topical sections based on the section interest score corresponding to each topical section;
  detecting a user interaction with a topic included in one of the topical sections;
  updating the section interest score for the one of the topical sections based on the user interaction;
  based on the updating of the section interest score for the one of the topical sections changing a ranking of the one of the topical sections relative to the other topical sections, performing the dynamic rearranging of the topical sections, adding one or more movement indication arrows to reflect the changing of the ranking, changing a size of the one of the topical sections, and based on a determination that the ranking of the one of the topical sections is the highest ranking, including additional information pertaining to the topic in a tabbed display area within the one of the topical sections, the additional information having not been included in the one of the topical sections when the one of the topical sections had a lower ranking, and an additional tabbed display area not being included within other topical sections having a ranking that is lower than the highest ranking.

2. The method of claim 1, wherein the user preference data is collected by analyzing past user interactions and wherein the past user interactions represent user interactions with a previous webpage displayed in the graphical user interface.

3. The method of claim 2, wherein user interactions include clicks, likes, shares, views, duration of user viewing, eye tracking data, and hover data.

4. The method of claim 1, wherein the server system stores user-specific preference data for each user of the server system; and further comprising:
   determining the particular user associated with the request; and
   accessing user preference data for the particular user before automatically generating the customized layout for the requested webpage.

5. The method of claim 1, wherein the automatic rearranging of the topical sections further includes:
   arranging the layout of the webpage such that topical sections that have a higher rank are displayed more prominently than topical sections with a low rank.

6. The method of claim 5, wherein the size of each topical section is determined based on the rank associated with each topical section.

7. The method of claim 1, further comprising;
   receiving an add topical section request for a new topical section; and
   generating an additional section interest score for the new topical section.

8. A system comprising:
   one or more processors;
   memory; and
   one or more programs stored in the memory, the one or more programs comprising instructions for configuring the one or more processors to perform operations for dynamically rearranging topical sections associated with a webpage displayed in a graphical user interface, the operations including:
   for each topical section, accessing user preference data associated with the topical section from a database associated with the server system and generating a section interest score for the topical section based on the user preference data, the user preference data including a user interest score for each of the topics included in the topical section, the user interest score based on interactions of a plurality of users with each of the topics, the section interest score representing a system-wide popularity of the topical section;
   automatically generating a customized layout for the requested webpage by arranging the topical sections based on the section interest score corresponding to each topical section;
   detecting a user interaction with a topic included in one of the topical sections;
   updating the section interest score for the one of the topical sections based on the user interaction;
   based on the updating of the section interest score for the one of the topical sections changing a ranking of the one of the topical sections relative to the other topical sections, performing the dynamic rearranging of the topical sections, adding one or more movement indication arrows to reflect the changing of the ranking, changing a size of the one of the topical sections, and based on a determination that the ranking of the one of the topical sections is the highest ranking, including additional information pertaining to the topic in a tabbed display area within the one of the topical sections, the additional information having not been included in the one of the topical sections when the one of the topical sections had a lower ranking, and an additional tabbed display are not being included within other topical sections having a ranking that is lower than the highest ranking.

9. The system of claim 8, wherein the user preference data is collected by analyzing past user interactions and wherein the past user interactions represent user interactions with a previous webpage displayed in the graphical user interface.

10. The system of claim 9, wherein user interactions include clicks, likes, shares, views, duration of user viewing, eye tracking data, and hover data.

11. The system of claim 8, wherein the server system stores user-specific preference data for each user of the server system; and further comprising instructions for:
   determining the particular user associated with the request; and
   accessing user preference data for the particular user before automatically generating the customized layout for the requested webpage.

12. A non-transitory computer-readable storage medium storing instructions that, when executed by the one or more processors of a machine, cause the machine to perform operations for dynamically rearranging topical sections associated with a webpage displayed in a graphical user interface, the operations comprising:
   for each topical section, accessing user preference data associated with the topical section from a database associated with the server system and generating a section interest score for the topical section based on the user preference data, the user preference data including a user interest score for each of the topics included in the topical section, the user interest score based on interactions of a plurality of users with each of the topics, the section interest score representing a system-wide popularity of the topical section;
   automatically generating a customized layout for the requested webpage by arranging the topical sections based on the section interest score corresponding to each topical section;
   detecting a user interaction with a topic included in the one of the topical sections;
   updating the section interest score for the one of the topical sections based on the user interaction;
   based on the updating of the section interest score for the one of the topical sections changing a ranking of the one of the topical sections relative to the other topical sections, performing the dynamic rearranging of the topical sections, adding one or more movement indication arrows to reflect the changing of the ranking, changing a size of the one of the topical sections, and based on a determination that the ranking of the one of the topical sections is the highest ranking, including additional information pertaining to the topic in a tabbed display area within the one of the topical sections, the additional information having not been included in the one of the topical sections when the one of the topical sections had a lower ranking, and an additional tabbed display are not being included within other topical sections having a ranking that is lower than the highest ranking.

13. The non-transitory computer-readable storage medium of claim 12, wherein the user preference data is collected by analyzing past user interactions and wherein the past user interactions represent user interactions with a previous webpage displayed in the graphical user interface.

14. The non-transitory computer-readable storage medium of claim 13, wherein user interactions include clicks, likes, shares, views, duration of user viewing, eye tracking data, and hover data.

15. The non-transitory computer-readable storage medium of claim 14, wherein the server system stores user-specific preference data for each user of the server system; and further comprising:

determining the particular user associated with the request; and accessing user preference data for the particular user before automatically generating the customized layout for the requested webpage.

16. The method of claim 1, wherein the one or more movement indication arrows are included in the user interface only for a subset of the one or more topical sections for which the changing of the ranking is recent.

17. The method of claim 6, wherein the updating of the section interest score is further based on a time interval having been reached.

18. The method of claim 1, the operations further comprising removing the additional tabbed area from one of the other topical sections based on the one of the other topical sections no longer ranking highest among the topical sections.

* * * * *